Jan. 10, 1956  S. T. SEMEGEN  2,730,159
METHOD OF MAKING GOLF BALLS
Filed Jan. 17, 1951  2 Sheets-Sheet 1

INVENTOR.
STEPHEN T. SEMEGEN
BY
ATTY.

Jan. 10, 1956 S. T. SEMEGEN 2,730,159
METHOD OF MAKING GOLF BALLS
Filed Jan. 17, 1951 2 Sheets-Sheet 2

INVENTOR.
STEPHEN T. SEMEGEN
BY
ATTY.

United States Patent Office 2,730,159
Patented Jan. 10, 1956

2,730,159

METHOD OF MAKING GOLF BALLS

Stephen T. Semegen, Cuyahoga Falls, Ohio, assignor to The B. F. Goodrich Company, New York, N. Y., a corporation of New York Application January 17, 1951, Serial No. 206,508

8 Claims. (Cl. 154—17)

This invention relates to golf ball cover compositions comprising a long-chain polyamide and especially to new and improved methods of applying such compositions to golf ball centers. This application is a continuation in part of my application filed February 7, 1950, Serial No. 142,950, now U. S. Patent No. 2,681,096 granted June 15, 1954, wherein long-chain polyamide covers for golf balls were disclosed.

It is an object of this invention to provide a composition suitable for golf ball covers having improved cut-resistance.

It is an object to provide a golf ball cover composition having the necessary physical properties such as "click," good driving distance, toughness, processability, resistance to cutting, good rebound, and long life.

It is a further object to provide an improved method of applying such a composition to a golf ball center or to a golf ball core to provide a satisfactory cover.

Other objects will be apparent from the description which follows.

Figure 1:
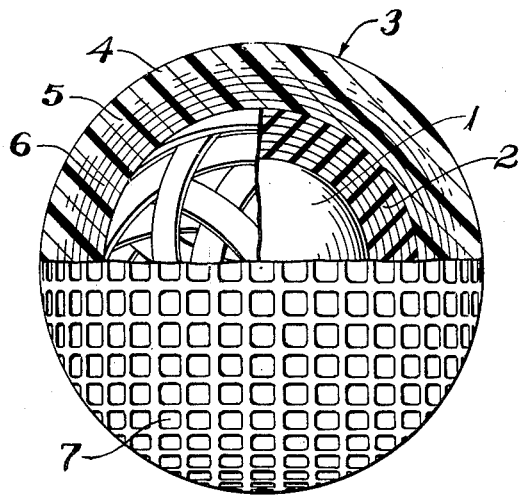
Figure 2:
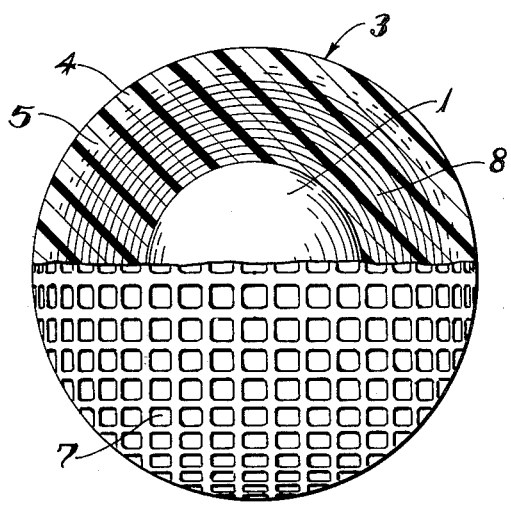
Figure 3:
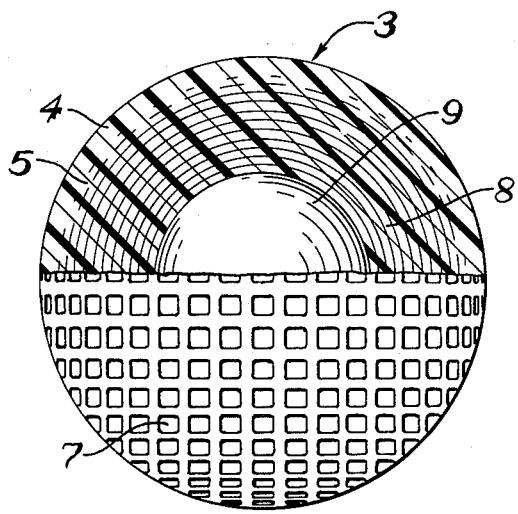

It has been discovered that a linear super-polyamide cover may be formed by winding a linear super-polyamide in the form of a yarn, string, strand, tape, thread, or band about a golf ball center and molding the wound ball to form the finished cover. As shown in the drawings, Figure 1, a golf ball made in accordance with the present invention comprises core 1, rubber center 2, and a linear superpolyamide cover indicated generally at 3. The fused linear superpolyamide is shown by numeral 4 as having melted and flowed to form a continuous cover. The numeral 5 shows that a part of the linear super-polyamide adjacent the surface exists as threads and 6 shows the area in which the linear superpolyamide has been unaffected. The numeral 7 indicates the general surface pattern of the ball. Figure 2, a modification of the structure of Figure 1, discloses center 8 of a linear superpolyamide as a continuous thread which is molded at suitable temperatures to form a cover integral therewith. Figure 3 is a further modification of the srtucture of Figure 1 wherein core 9 is of a linear superpolyamide wrapped with linear superpolyamide thread to form the center which is covered with fused linear superpolyamide thread which is integral with the thread of the center.

The invention may be described by means of a particular example as follows.

A conventional rubber golf ball core is wrapped with rubber thread in the usual manner to form a golf ball center. The core comprises a small rubber sphere which may be filled with a liquid or may be of a solid construction. Instead of forming half-shells of the cover material and molding two of these half-shells about the golf ball center according to the method used formerly, the golf ball center is wrapped with a linear super-polyamide thread. The long-chain polyamide is one having a linear polymeric structure containing recurring

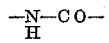

groups which are separated by hydrocarbon groups containing at least two carbon atoms, from 1% to about 15% of the amido hydrogen atoms being replaced by alkoxymethyl radicals to give recurring groups of the structure

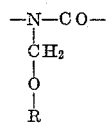

where R is an alkyl group having from 1 to 8 carbon atoms. The wrapped cover of linear super-polyamide is about .040" thick and overlies the rubber threads wrapped on the rubber core. The wrapped golf ball is placed in a mold and held at 300° F. for 2 to 3 minutes. The surface of the polyamide cover flows to take the dimpled surface configuration of the mold, and the body of the cover remains at a temperature below the softening point. Using such a cover material and a short heating period, it has been found that the underlying rubber threads of the golf ball center will not be damaged by the heat required for molding. The cover has excellent cut-resistance and the ball has excellent rebound and drive characteristics.

If desired, the molding may be carried out in two steps, the wrapped ball being placed in a mold and held at 225° F. for 6 minutes and then held an additional 2 minutes at 300° F. This ball has a cover which is fused throughout its extent and not merely at the surface. The cover fuses and flows between the rubber threads of the center to provide a tightly held cover. This fused cover likewise has excellent cut-resistance and the ball excellent rebound and drive characteristics.

The particular linear super-polyamide used is not critical; however it is preferable to use one having a relatively low melting point in order to avert damage to the golf ball center during the molding step of the process. The synthetic linear super-polyamides having a minor proportion of the amido hydrogen atoms replaced with alkoxymethyl or alkoxyethyl or other alkoxy-alkyl radicals have low softening points. Unsubstituted polyamides may be used satisfactorily in the methods of this invention, however.

Moisture absorption properties of the linear super-polyamides used are not too important here since the thread is preferably wrapped dry and the molding step completed without adding moisture to the wrapped super-polyamide. However, in one embodiment of the invention a wrapped ball is introduced into a water or water vapor bath prior to molding for a sufficient time to allow water absorption by the linear super-polyamide fibers. The water acts as a plasticizer for the linear super-polyamide and improves molding characteristics somewhat. Instead of water a water solution of an alcohol such as methyl, ethyl, propyl or butyl alcohol or the straight alcohol alone may be used as the plasticizer. A water solution of any of the lower alcohols is a satisfactory plasticizer for the cover material. After dipping, the center may be dried.

The linear super-polyamide may be mixed with pigments before processing it into threads which are wound on the conventional golf ball centers. The term "thread" as used herein is meant to include strands, threads, yarns, monofilaments or multistrands. The thickness of the thread may vary from a very few thousandths of an inch to about .025". The thickness should be great enough to prevent breakage during the winding step. Likewise, it must not be so thin that the time required to build up the required thickness of the cover is too long to be commercially feasible. The thread may be formed by sheeting out a suitable linear super-polyamide on a roll mill and then cutting the sheets of the desired thickness into strips of the proper width. Also, strands of the desired diameter may be extruded. The cover thickness may vary from about 0.020" to 0.090". A cover which is too thick tends to destroy the driving distance while a too thin cover gives inadequate coverage if normal production methods as given in the example are used.

The rubber threads wrapped about the golf ball core are generally wrapped under tension, the thread tension being controlled so as not to go beyond about ¾ of the ultimate elongation of the thread. Likewise the super-polyamide thread may be wrapped under tension. It is not necessary to wrap under tension, but it is preferable to do so. The alkoxy-alkyl substituted polyamides have an ultimate elongation of as much as 300 or 400%. Therefore the super-polyamide thread may be wound upon the center under as much as 300% elongation depending upon the polymer used to obtain a tight and secure cover.

Although the specific example describes a method comprising wrapping a rubber golf ball core with rubber thread to form a golf ball center and then wrapping this center with a linear super-polyamide thread, it should be understood that the ball may be constructed in various other ways. For instance, a rubber core may be wrapped with nylon thread alone and molded to form a finished ball. Likewise, a nylon core may be wound with nylon thread to form a ball which is molded at such a temperature and for such a curing time that only the outer threads are fused to form a cover.

Generally the center, i. e., the thread wound core, is wound with a linear super-polyamide thread to form a ball having a diameter slightly larger than the desired diameter for the finished ball and then the ball is flash molded to the specified diameter. The press platen temperatures may vary from about 190° to 400° F. depending upon the type of super-polyamide used. The length of time that the ball is left in the mold must be about 15 minutes at 190° F., the lower end of the temperature range, and less than 5 minutes and preferably about 1 minute at 400° F., the upper end of the temperature range.

The molded balls are buffed and painted in the conventional manner.

The expedient of cooling the golf ball centers in a dry ice chest before combining them with a wrapped cover may be used to prevent relaxation of the underlying rubber threads due to overheating during the molding step.

The methods of this invention have definite advantages over the old methods of applying a cover. There is no need of forming half shells of the cover material; therefore no molding apparatus is needed to form such shells. Since the wound cover has no seams, there is no danger of a seam opening up while the ball is in use. Formerly the seam between the half shells sometimes opened when the ball was struck a sharp blow. By using the proper long chain polyamides it is possible to use molding temperatures which have no deleterious effect upon the golf ball centers. Furthermore, only the surface of the wound cover may be fused; therefore curing times may be shortened still further and the fusing temperatures may be lower. The fused outer strands form a unitary cover which is very satisfactory in every respect.

Although specific embodiments of the invention have been disclosed, it is not intended that the invention be limited thereto, rather it is intended to include all the obvious variations and modifications falling within the spirit and scope of the claims.

I claim:

1. In the method of producing golf balls containing a core, a center and a cover, the steps comprising wrapping a golf ball core with a thread under tension of a long-chain linear super-polyamide wherein the amide groups are separated by hydrocarbon groups containing at least two carbon atoms and wherein from 1 to about 15% of the amido hydrogen atoms have been replaced with alkoxy-alkyl radicals forming recurring groups of

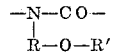

in which R is alkyl and R' is alkyl having from 1 to 8 carbon atoms in an amount sufficient to provide a center and a cover, and then molding said wrapped core at a temperature of from 400 to 190° F. for from 1 to 15 minutes to form a continuous, uniform and fused cover a said super polyamide thread.

2. In the method of producing golf balls containing a core, a center and a cover, the steps comprising wrapping a golf ball core with a thread under tension of a long chain linear super-polyamide wherein the amide groups are separated by hydrocarbon groups containing at least two carbon atoms and wherein from 1 to about 15% of the amido hydrogen atoms have been replaced with alkoxy-alkyl radicals forming recurring groups of

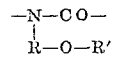

in which R is alkyl and R' is alkyl having from 1 to 8 carbon atoms in an amount sufficient to provide a center and a cover and heat molding said wrapped thread cover for a time and at a temperature sufficient to fuse into a continuous and uniform mass at least the outer surface layers of said wrapped thread of said cover without causing relaxation of the underlying tension wrapped threads of the center.

3. The method of providing a golf ball cover about a golf ball center of tension wrapped thread comprising wrapping a thread of a long-chain linear super-polyamide wherein the amide groups are separated by hydrocarbon groups containing at least two carbon atoms about said golf ball center, treating said wrapped center with a fluid plasticizer selected from the group consisting of water and alcohol and mixtures thereof to plasticize said wrapped center, drying said treated and wrapped center and heat molding said wrapped center to form a continuous, uniform and fused cover without causing relaxation of the tension wrapped threads of the center.

4. The method according to claim 3 in which said alcohol is methyl alcohol.

5. The method according to claim 3 in which said alcohol is ethyl alcohol.

6. The method according to claim 3 in which said alcohol is propyl alcohol.

7. The method according to claim 3 in which said alcohol is butyl alcohol.

8. The method of providing a golf ball cover about a golf ball center of tension wrapped thread comprising wrapping a thread of a long-chain linear super-polyamide wherein the amide groups are separated by hydrocarbon groups containing at least two carbon atoms and wherein from 1 to about 15% of the amido hydrogen atoms have been replaced with alkoxy-alkyl radicals forming recurring groups of

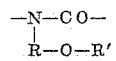

in which R is alkyl and R' is alkyl having from 1 to 8 carbon atoms about said golf ball center, treating said wrapped center with a fluid plasticizer selected from the group consisting of water and alcohol and mixtures thereof to plasticize said wrapped center, drying said treated and wrapped center and heat molding said wrapped center to form a continuous, uniform and fused cover without causing relaxation of the tension wrapped threads of the center.

References Cited in the file of this patent

UNITED STATES PATENTS

| | | |
|---|---|---|
| 2,050,402 | Walsh | Aug. 11, 1936 |
| 2,143,544 | Crawford | Jan. 10, 1939 |
| 2,252,554 | Carothers | Aug. 12, 1941 |
| 2,284,265 | Hurt | May 26, 1942 |
| 2,320,088 | Leekley | May 25, 1943 |
| 2,430,908 | Cairns | Nov. 18, 1947 |
| 2,430,910 | Charch | Nov. 18, 1947 |
| 2,456,271 | Graham | Dec. 14, 1948 |
| 2,474,923 | Watkins | July 5, 1949 |
| 2,486,952 | Kearsley et al. | Nov. 1, 1949 |
| 2,499,344 | Smith | Feb. 28, 1950 |
| 2,599,390 | Huse | June 3, 1952 |

FOREIGN PATENTS

| | | |
|---|---|---|
| 29,396 | Great Britain | 1904 |
| 1,984 | Great Britain | 1906 |
| 620,208 | Great Britain | Mar. 22, 1949 |